United States Patent
Tsuda et al.

(10) Patent No.: US 8,535,584 B2
(45) Date of Patent: Sep. 17, 2013

(54) METHOD OF MANUFACTURING AN AUTOMOTIVE INTERIOR MEMBER

(75) Inventors: Itsuki Tsuda, Kariya (JP); Kanehide Narita, Kariya (JP)

(73) Assignee: Toyota Boshoku Kabushiki Kaisha, Aichi (JP)

( * ) Notice: Subject to any disclaimer, the term of this patent is extended or adjusted under 35 U.S.C. 154(b) by 929 days.

(21) Appl. No.: 12/617,830

(22) Filed: Nov. 13, 2009

(65) Prior Publication Data

US 2010/0102472 A1    Apr. 29, 2010

Related U.S. Application Data

(62) Division of application No. 11/882,399, filed on Aug. 1, 2007, now abandoned.

(30) Foreign Application Priority Data

Aug. 3, 2006    (JP) ................................. 2006-211724

(51) Int. Cl.
  *B29C 44/34*    (2006.01)
  *B29C 44/38*    (2006.01)
  *B29C 45/08*    (2006.01)

(52) U.S. Cl.
  USPC .......................................... 264/51; 264/328.7

(58) Field of Classification Search
  None
  See application file for complete search history.

(56) References Cited

U.S. PATENT DOCUMENTS

| | | | | |
|---|---|---|---|---|
| 4,769,278 A | * | 9/1988 | Kamimura et al. | 442/326 |
| 4,783,114 A | * | 11/1988 | Welch | 296/153 |
| 5,292,465 A | * | 3/1994 | Kobayashi et al. | 264/45.5 |
| 5,576,080 A | * | 11/1996 | Sugimoto et al. | 428/36.5 |
| 5,663,210 A | * | 9/1997 | Sugimoto et al. | 521/81 |
| 5,676,786 A | * | 10/1997 | Mizuno et al. | 156/245 |

(Continued)

FOREIGN PATENT DOCUMENTS

| | | |
|---|---|---|
| JP | 06-006123 | 1/1994 |
| JP | 07-039259 | 5/1995 |

(Continued)

OTHER PUBLICATIONS

Notification of Reasons for Refusal issued Aug. 17, 2010 in Japanese Application No. 2006-211724.

(Continued)

*Primary Examiner* — Benjamin Schiffman
(74) *Attorney, Agent, or Firm* — Wenderoth, Lind & Ponack, L.L.P.

(57) ABSTRACT

An automotive interior material with high appearance quality and a method of manufacturing the same includes a door trim (automotive interior material) having a flat portion (main-body portion) covering a door panel and an armrest protruding into the vehicle compartment. Molten resin material added with a foaming agent is supplied into a cavity formed between a pair of molds. Then, opening of the pair of molds by a predetermined amount causes the molten resin material in the cavity to foam. An upper surface (vertical wall portion) of the armrest is connected to the flat portion and extends in a thickness direction of the flat portion. A surface of the upper surface facing outward from the vehicle compartment is formed with a recessed portion. During a vehicle collision, an object in the vehicle presses the arm rest formed on the door trim. Then the door trim is broken and deformed in the recessed portion, so that the armrest is crushed, thus absorbing an impact by a collision.

6 Claims, 7 Drawing Sheets

(56) References Cited

U.S. PATENT DOCUMENTS

| | | | |
|---|---|---|---|
| 5,759,464 A * | 6/1998 | Matsumoto et al. | 264/138 |
| 5,961,902 A | 10/1999 | Ishitoya et al. | |
| 5,962,034 A * | 10/1999 | Matsumoto et al. | 425/111 |
| 6,660,195 B2 | 12/2003 | Usui et al. | |
| 6,685,875 B2 | 2/2004 | Usui et al. | |
| 6,730,248 B2 | 5/2004 | Akimoto et al. | |
| 6,742,830 B2 * | 6/2004 | Zimmerman et al. | 296/146.7 |
| 6,794,034 B2 | 9/2004 | Ogawa et al. | |
| 6,921,571 B2 | 7/2005 | Funakoshi | |
| 2001/0021457 A1 | 9/2001 | Usui et al. | |
| 2006/0141240 A1 | 6/2006 | Ota et al. | |
| 2006/0163764 A1 | 7/2006 | Hanada et al. | |
| 2006/0163765 A1 | 7/2006 | Hanada et al. | |
| 2006/0222841 A1 | 10/2006 | Masumizu et al. | |

FOREIGN PATENT DOCUMENTS

| | | |
|---|---|---|
| JP | 09-300375 | 11/1997 |
| JP | 2002-225058 | 8/2002 |
| JP | 2002-225165 | 8/2002 |
| JP | 2004-525028 | 8/2004 |

OTHER PUBLICATIONS

Office Action dated Feb. 2, 2009 in U.S. Appl. No. 11/882,399.

\* cited by examiner

METHOD OF MANUFACTURING AN AUTOMOTIVE INTERIOR MEMBER

CROSS REFERENCE TO RELATED APPLICATION

This is a Divisional Application of U.S. application Ser. No. 11/882,399, filed Aug. 1, 2007, now abandoned the contents of which is fully incorporated herein by reference.

TECHNICAL FIELD

The present invention relates to an automotive interior material and a method of manufacturing the same.

BACKGROUND

A door trim, a type of interior material, is attached onto a vehicle door inside the vehicle compartment. The door trim is usually formed with synthetic resin material, and an armrest is integrally formed on the surface of the door trim inside the vehicle compartment. The armrest is a shelf that supports the forearm of a vehicle occupant comfortably and protrudes into the vehicle compartment by a predetermined amount. The armrest, during a vehicle collision, may hit an object in the vehicle compartment, thus causing some damage to the object.

To reduce the damage to the object during a vehicle collision, a conventional technique exists in which a notched groove of a substantially triangular shape in cross section is formed at a base portion of an armrest formed on a door trim, for example, as disclosed in Japanese Utility Model Laid-Open No. 6-6123 (FIG. 1 at page 5). The notched groove is formed on the surface of the door trim facing outward from the vehicle compartment, extending in the vehicle longitudinal direction. If the armrest is pressed by the object in the vehicle compartment during a vehicle collision, the notched groove is broken and the armrest is crushed while absorbing the collision energy. This enables a reduction in damage to the object during the vehicle collision.

Recently, the need in the market to reduce vehicle weight has intensified and door trims are no exception. To reduce the vehicle weight, resin foam material has been used as a material for automotive interior materials, such as door trim and the like.

Inventors of the present invention, as described below, have attempted to use resin foam material to form a door trim capable of reducing damage to an object during a vehicle collision.

As shown in FIG. 6, a cavity CV is formed between an opposing movable mold 7 and stationary mold 8 which are disposed vertically. On the surface of the stationary mold 8 that forms the cavity CV, there is formed a protrusion portion 81 of a substantially triangular shape in cross section. The protrusion portion 81 is formed extending in a vertical direction relative to the plane of the paper in FIG. 6.

As shown in FIG. 7, after the molten resin material SR added with a foaming agent is supplied into the cavity CV, the movable mold 7 is moved away from the stationary mold 8 to open the movable mold 7 by a predetermined amount. This causes the molten resin material SR to foam and a door trim 9 is formed. The operation of opening the movable mold 7 by the predetermined amount to foam the molten resin material SR may be called core-back. At core-back, a notched groove 91 is formed by the protrusion portion 81 on the surface of the door trim 9 in contact with the stationary mold 8.

As shown in FIG. 7, a portion forming the notched groove 91 of the door trim 9 is smaller than any other portion in thickness. Accordingly, the portion forming the notched groove 91 has a reduced volume of resin material due to the reduced thickness and does not have sufficient thickness even after the resin material is foamed. In this case, on the surface of the door trim 9 in contact with the movable mold 7, a depression 92 is unavoidably formed at a location opposite to the notched groove 91. Formation of the depression 92 on a decorative surface of the door trim 9 (the surface in contact with the movable mold 7) will impair the appearance of the door trim 9.

SUMMARY

The present invention accounts for the aforementioned circumstances and its object is to provide an automotive interior material with a pleasing appearance quality and a method of manufacturing the same.

The present invention relates to a method of manufacturing automotive interior material, the automotive interior material being mounted on a vehicle body inside the vehicle compartment and having a recessed portion of a thin-wall shape in cross section on a surface facing outward from the vehicle compartment, the automotive interior material being pressed by an object in a vehicle and deformed by the recessed portion so as to absorb an impact during a vehicle collision and the automotive interior material including a main body covering the vehicle body and a vertical wall portion connected to the main body and extending in a thickness direction of the main-body portion, the method including the steps of: providing a protrusion portion on a portion that forms the vertical wall portion of a mold and supplying molten resin material added with a foaming agent into the mold; opening the mold by a predetermined amount in a main-body thickness direction after supplying the molten resin material into the mold to foam the molten resin material and to foam the main body with a predetermined thickness; and forming the recessed portion for the vertical wall portion by the protrusion portion.

According to the present invention, the vertical wall portion extends in the main-body thickness direction (mold opening direction). The recessed portion is formed in the vertical wall portion, permitting molten resin to foam sufficiently at other portions except the recessed portion when the mold is opened. Accordingly, no depression will be formed on a decorative surface of the automotive interior material.

Preferably, the present invention has the following configuration:

(1) The automotive interior trim member manufactured according to a manufacturing method of the present invention can reduce damage to an object in a vehicle. The automotive interior trim member manufactured according to a manufacturing method of the present invention forms no depression or the like on a decorative surface.

(2) Preferably, the automotive interior material is a door trim, and the vertical wall portion constitutes an upper surface of an armrest formed on the door trim. During a vehicle collision, a thin-wall portion is deformed by a pressure of an object, so that the armrest is crushed. This can reduce damage to the object without particularly changing the shape of the armrest.

According to the present invention, an automotive interior material with a pleasing appearance can be manufactured, because there is no depression or the like on a decorative surface.

DETAILED DESCRIPTION OF THE INVENTION (First Illustrative Aspect)

Figure 1:
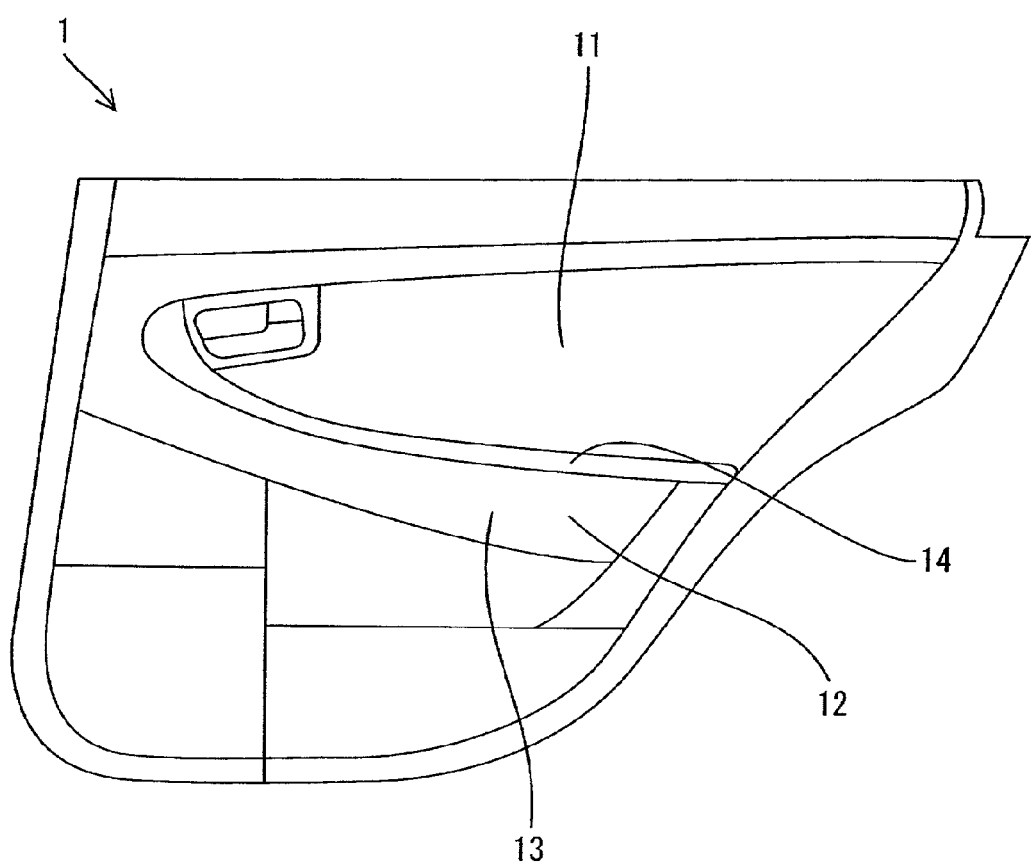
FIG. 1 is a front view of a door trim according to a first illustrative aspect seen from the interior side of the vehicle compartment.
Figure 2:
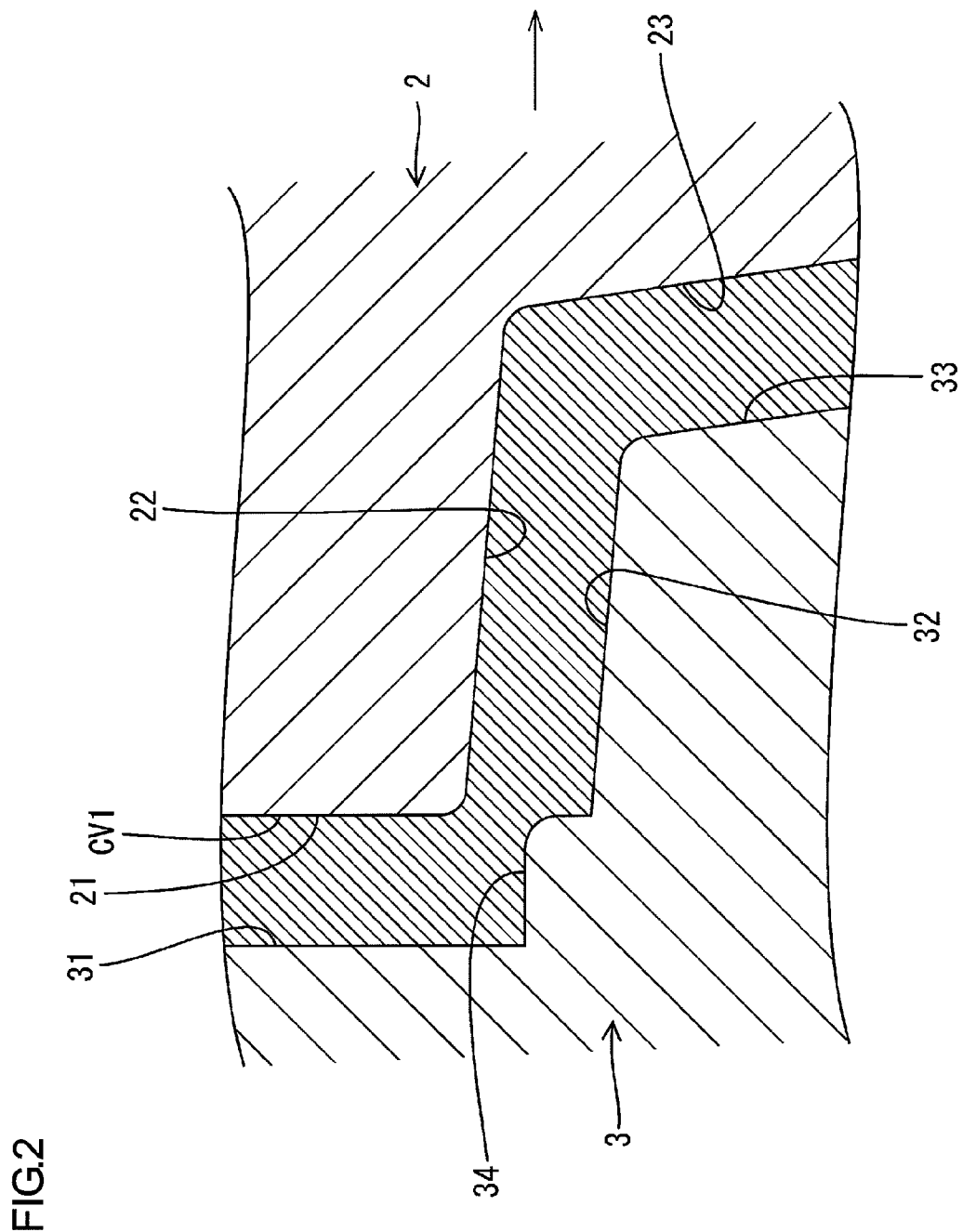
FIG. 2 is a sectional view of a mold filled with unfoamed molten resin to form the door trim shown in FIG. 1.
Figure 3:
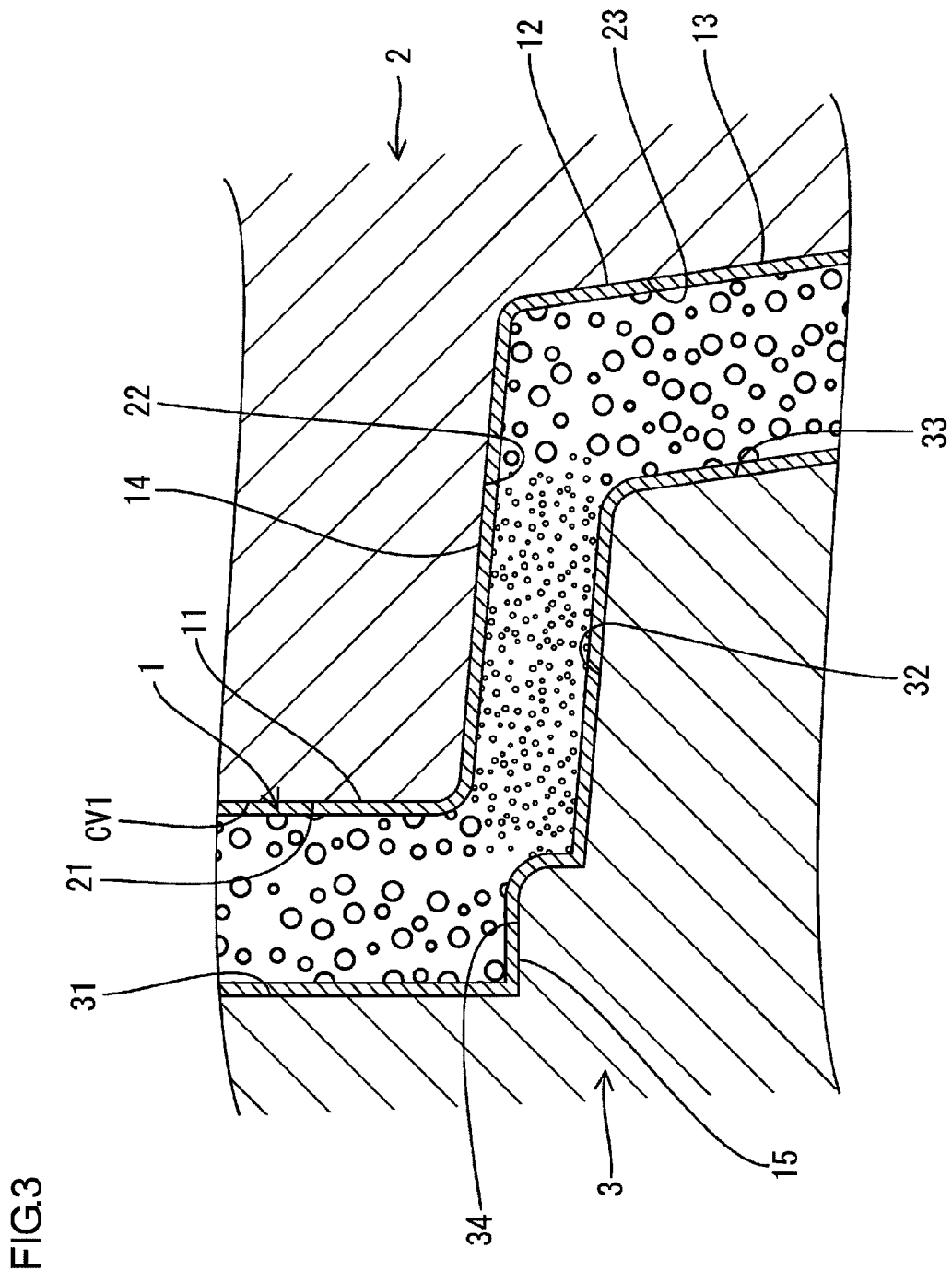
FIG. 3 is a sectional view of molten resin foamed through the core-back of the mold shown in FIG. 2.

Referring now to FIGS. 1 to 3, the first illustrative aspect according to the present invention will be described below. The right side of a door trim 1 shown in FIG. 3 is the interior side of a vehicle compartment and a surface inside the vehicle compartment is a decorative surface. The door trim 1 according to the present illustrative aspect is a type of automotive interior material attached on the interior side of the vehicle compartment.

The door trim 1 according to the present illustrative aspect is molded by foaming synthetic resin material added with a foaming agent. The synthetic resin material may use thermoplastic synthetic resin material such as polypropylene. The foaming agent may use bicarbonate such as sodium hydrogencarbonate, chemical foaming agent or the like.

The door trim 1 is not limited to the above, but is used for rear seat doors of a vehicle and is attached on a door panel of the rear seat doors (not shown) inside the vehicle compartment. The door panel corresponds to a vehicle body of the present invention.

As shown in FIG. 1, the door trim 1 has a flat portion 11 covering a door panel and an upper surface 14 connected to the flat portion 11 and extending in a thickness direction of the flat portion 11. The flat portion 11 corresponds to the main body of the present invention. The upper surface 14 corresponds to the vertical wall portion of the present invention.

As shown in FIG. 1, substantially in the center of the door trim 1, there is formed an armrest 12 extending into the vehicle compartment. The armrest 12 is a shelf that supports the forearm of a rear-seat occupant comfortably. The upper surface 14 is the upper surface of the armrest 12.

As shown in FIG. 2, a pair of molds 2, 3 are disposed so as to face each other horizontally. Between the pair of molds 2, 3, a cavity CV1 is formed. The one mold 2 is a movable mold and forms a decorative surface of the door trim 1 (a surface inside the vehicle compartment), while the other mold 3 is a stationary mold and forms a surface of the door trim 1 facing outward from the vehicle compartment.

As shown in FIG. 2, the pair of molds 2, 3 have opposing surfaces 21, 31 for forming the flat portion 11, respectively. The opposing surfaces 21, 31 are substantially parallel to each other and extend vertically, respectively.

As shown in FIG. 2, horizontal surfaces 22, 32 for forming the upper surface 14 of the armrest 12 extend from the opposing surfaces 21, 31, respectively. The horizontal surfaces 22, 32 extend laterally so as to slightly tilt downward and extend substantially parallel to each other.

As shown in FIG. 2, vertical surfaces 23, 33 for forming the front surface 13 of the armrest 12 extend from the horizontal surfaces 22, 32. The vertical surfaces 23, 33 extend obliquely downward, respectively.

As shown in FIG. 2, an end portion of the horizontal surface 32 facing outward from the vehicle compartment has an upward protruding protrusion portion 34 formed thereon. The protrusion portion 34 is formed on the horizontal surface 32 extending in a front/reverse direction of the paper in FIG. 2.

The door trim 1 can be produced in the following processes:

First, molten resin material such as polypropylene added with a foaming agent is injected and supplied into the cavity CV1 formed between the pair of molds 2, 3. At a predetermined period after the molten resin material is supplied into the cavity CV1, the one mold 2 (movable mold) is moved away from the other mold 3 (stationary mold) (core-back of the mold 2). This allows the pair of molds 2, 3 to open, by a predetermined amount, in a thickness direction of the flat portion 11 (a direction indicated by an arrow in FIG. 2). Then, as shown in FIG. 3, an internal pressure of the cavity CV1 lowers to foam the molten resin material with which the cavity CV1 is filled, thus forming the door trim 1.

As shown in FIG. 3, the foamed molten resin material is formed to have a predetermined thickness by the opposing surfaces 21, 31 and the vertical surfaces 23, 33 of the pair of molds 2, 3. This forms the flat portion 11 and the front surface 13 of the armrest 12.

As shown in FIG. 3, the upper surface 14 of the armrest 12 is formed by the horizontal surfaces 22, 32 of the pair of molds 2, 3. In other words, the upper surface 14 of the armrest 12 is formed by a region sandwiched by the horizontal surfaces 22, 32 in the pair of molds 2, 3.

On one end of the upper surface 14 of the armrest 12 facing outward from the vehicle compartment, there is formed a recessed portion 15 recessed upward. The recessed portion 15 is formed by the protrusion portion 34 provided on the mold 3 (stationary mold). The recessed portion 15 is formed in a surface of the door trim 1 facing outward from the vehicle compartment. The bottom of the recessed portion 15 is a thin-wall portion in which part of the door trim 1 is formed into a thin-wall shape.

The recessed portion 15 is formed extending in a lengthwise direction of the armrest 12 (vehicle longitudinal direction). The upper surface 14 of the armrest 12 extends in such a direction as to approximately meet the opening direction of the mold 2 (thickness direction of flat portion 11). In the opening direction of the mold 2 (core-back direction) before and after the core-back, a ratio of change in a length of the upper surface 14 of the armrest 12 is lower than that in a thickness of the flat portion 11 of the door trim 1.

Accordingly, a surface (decorative surface) of the upper surface 14 of the armrest 12 inside the vehicle compartment will not have a depression resulting from a shortage of molten resin. The reason is that a portion forming the recessed portion 15 in the upper surface 14 of the armrest 12 has little molten resin, while other portions, except the recessed portion 15, have a sufficient amount of molten resin, so that molten resin can be sufficiently foamed at other portions except the recessed portion 15, thus minimizing an influence of the recessed portion 15.

As shown in FIG. 3, a portion surrounded by the horizontal surfaces 22, 32 is formed so as to be longer than a distance (core-back amount) for retracting the mold 2 (movable mold).

This allows molten resin to be foamed at both ends of the upper surface 14 and a part of molten resin is not caused to foam in the center of the upper surface 14.

The door trim 1 formed in this way is mounted on a door panel of a vehicle door inside the vehicle compartment. During a vehicle collision, an object in the vehicle presses the armrest 12 formed on the door trim 1. In this case, the door trim 1 is broken and deformed in the recessed portion 15, so that the armrest 12 is crushed. This can absorb an impact resulting from the collision.

In the present illustrative aspect, the upper surface 14 of the armrest 12 extends in a thickness direction (opening direction of mold 2) of the flat portion 11. Accordingly, even though the recessed portion 15 is formed on the upper surface 14, no depression or the like will be formed on the upper surface 14. The reason is that, when the pair of molds 2, 3 are opened, molten resin exists sufficiently in the other portions except the recessed portion 15, such that the molten resin can foam a sufficient amount.

In the present illustrative aspect, no depression or the like will be formed on a decorative surface of the door trim 1, and a door trim 1 with a pleasing appearance can be manufactured. A thickness direction of the upper surface 14 of the armrest 12 is different from an opening direction of the mold 2 (movable mold). Accordingly, even after the foaming of a molten resin, the thickness of the upper surface 14 of the armrest 12 hardly changes, which will form no depression or the like on the upper surface 14 of the armrest 12.

During a vehicle collision, the armrest 12 is pressed by an object in a vehicle. This causes the armrest 12 to be deformed and crushed in the recessed portion 15. Accordingly, the door trim 1 according to the present illustrative aspect can mitigate damage to the object during a vehicle collision without particularly changing the shape of the armrest 12.

(Second Illustrative Aspect)

Figure 4:
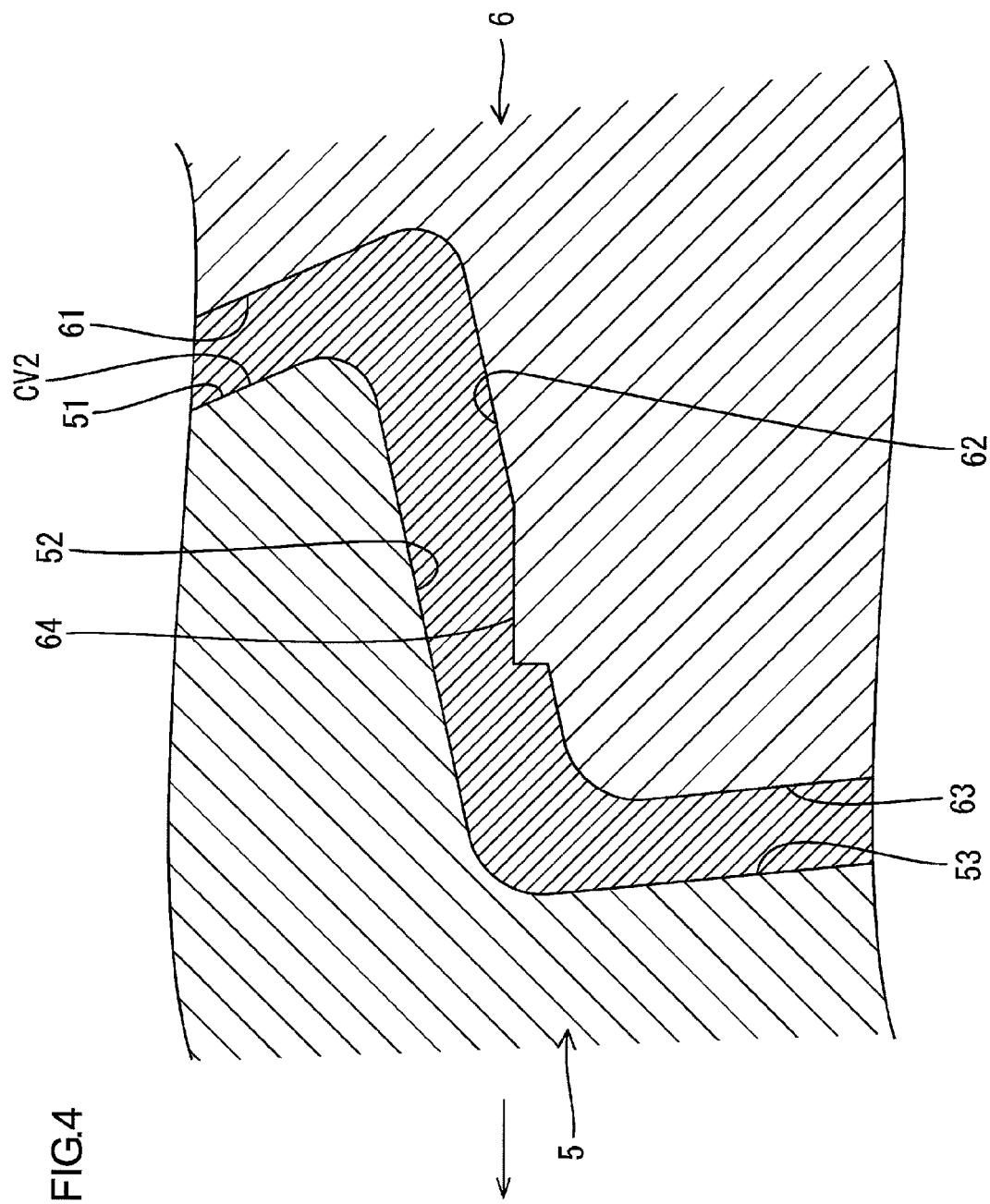
FIG. 4 is a sectional view of a mold filled with unfoamed molten resin to form a door trim according to a second illustrative aspect.
Figure 5:
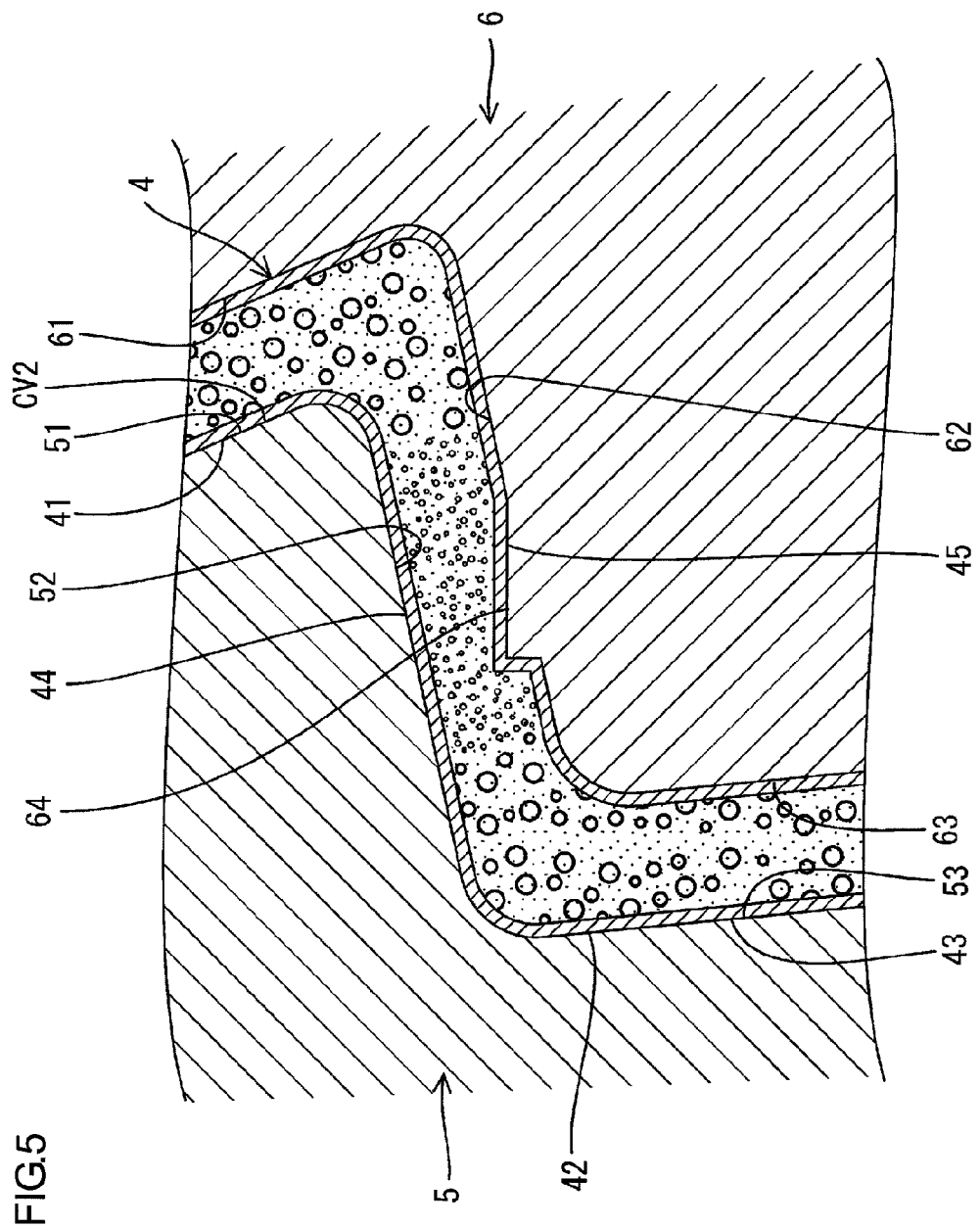
FIG. 5 is a sectional view of molten resin foamed through the core-back of the mold shown in FIG. 4.
Figure 6:
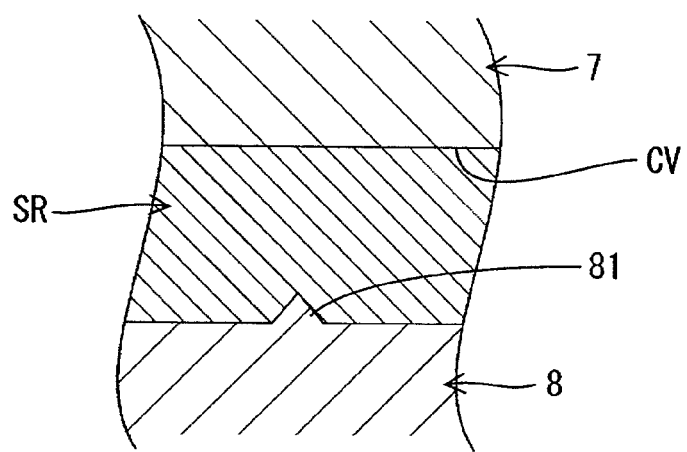
FIG. 6 is a view showing a conventional technique and a sectional view of a mold filled with unfoamed molten resin to form a thin-wall portion on a door trim.
Figure 7:
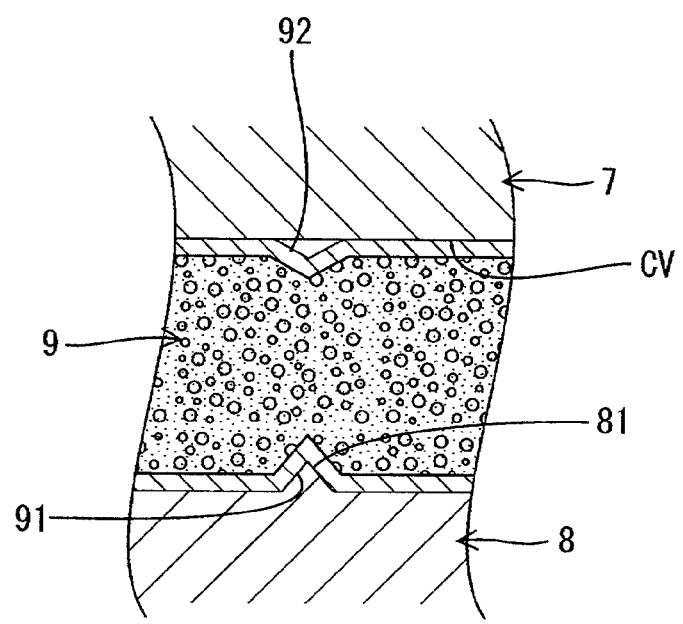
FIG. 7 is a view showing a conventional technique and a sectional view of molten resin foamed through the core-back of the mold shown in FIG. 6.

Referring to FIGS. 4-5, the second illustrative aspect according to the present invention will be described blow. The left side of a door trim 4 shown in FIG. 5 is the interior side of a vehicle compartment and a surface inside the vehicle compartment is a decorative surface.

As shown in FIG. 4, a pair of molds 5, 6 are disposed so as to face each other horizontally. Between the pair of molds 5, 6, a cavity CV2 is formed. The one mold 5 is a movable mold and forms a decorative surface of the door trim 4 (a surface inside the vehicle compartment), while the other mold 6 is a stationary mold and forms a surface of the door trim 4 facing outward from the vehicle compartment.

In the same way as described in the first illustrative aspect, a pair of molds 5, 6 have opposing surfaces 51, 61 for forming a flat portion 41, horizontal surfaces 52, 62 for forming an upper surface 44 of an armrest 42 and vertical surfaces 53, 63 for forming a front surface 43 of the armrest 42, respectively. The vertical surfaces 53, 63 extend obliquely downward from ends of the horizontal surfaces 52, 62.

In the present illustrative aspect, a protrusion portion 64 is formed substantially at a central portion of the horizontal surface 62 of the mold 6 (stationary type) in the lengthwise direction. A cross section of the protrusion portion 64 is formed into a substantially triangular shape. The protrusion portion 64 is formed on the horizontal surface 62 in the same way as protrusion portion 34 in the first illustrative aspect 1 and extends in a front/reverse direction of the paper in FIG. 4.

The door trim 4 can be produced by the following processes: First, molten resin material such as polypropylene added with a foaming agent is injected and supplied into the cavity CV2 formed between the pair of molds 5, 6. At a predetermined period after the molten resin material is supplied into the cavity CV2, the one mold 5 (movable mold) is moved away from the other mold 6 (stationary mold) (coreback of the mold 5). This allows the pair of molds 5, 6 to open, by a predetermined amount, in a thickness direction of the flat portion 41 (a direction indicated by an arrow in FIG. 4). Then, as shown in FIG. 5, an internal pressure of the cavity CV2 lowers to foam the molten resin material with which the cavity CV2 is filled, thus forming the door trim 4.

As shown in FIG. 5, the foamed molten resin material is formed to have a predetermined thickness by the opposing surfaces 51, 61 and the vertical surfaces 53, 63 of the pair of molds 5, 6. This forms the flat portion 41 and the front surface 43 of the armrest 42.

As shown in FIG. 5, the upper surface 44 of the armrest 42 is formed by the horizontal surfaces 52, 62 of the pair of molds 5, 6. In other words, the upper surface 44 of the armrest 42 is formed by a region sandwiched by the horizontal surfaces 52, 62 in the pair of molds 5, 6.

Substantially in the center of the upper surface 44 of the armrest 42, there is formed a notched groove 45 recessed upward. The notched groove 45 corresponds to a recessed portion in the present invention. The recessed portion 45 is formed by the protrusion portion 64 provided on the stationary mold 6. The notched groove 45 is formed in a surface of the door trim 4 facing outward from the vehicle compartment. The bottom of the notched groove 45 is a thin-wall portion in which part of the door trim 4 is formed into a thin-wall shape.

On other configurations, descriptions thereof are omitted because of the similarities to the first illustrative aspect. According to the door trim 4 of the present illustrative aspect, the notched groove 45 is formed at a central portion of the upper surface 44 in a width direction. The upper surface 44 of the armrest 42 extends in a thickness direction of the flat portion 41. Accordingly, even though the notched groove 45 is formed in the upper surface 44, molten resin can be foamed sufficiently because other portions except the notched groove 45 have a sufficient amount of molten resin. Accordingly, this enables manufacture of the door trim 4 with a pleasing appearance without forming a depression or the like on a decorative surface of the door trim 4.

(Other Illustrative Aspects)

The present invention is not limited to foregoing descriptions and illustrative aspects described referring to the drawings. For example, the following illustrative aspects are included as well in the technical scope of the present invention and further in addition to the following, various changes and implementations may be made without departing from the spirit and the scope of the present invention:

(1) The upper surface (vertical wall portion) of an armrest is not required to extend in such a direction as to completely meet a thickness direction of a flat portion. If an amount of molten resin material to be foamed is sufficient, the upper surface of the armrest may extend in a different direction from the thickness direction of the flat portion.

(2) The opening direction of a pair of molds is not required to completely meet the thickness direction of the flat portion. For example, as shown in the second illustrative aspect, there may be used a pair of molds which open in a slightly different direction from the thickness direction of the flat portion.

(3) The recessed portion (thin-wall portion) may have any shape, provided that the door trim can be deformed if pressed during a vehicle collision.

(4) The recessed portion (thin-wall portion) is not required to be formed on an upper surface of an armrest. For example, the recessed portion may be formed in a peripheral edge portion of a door trim. Otherwise, the recessed portion may be formed at a flange portion or the like extending in an opening direction of a mold.

(5) In forming the recessed portion in an upper surface of an armrest, the armrest is formed at a position in a width direction where no depression or the like is formed on a decorative surface. Specifically, an armrest may be formed at any position in a width direction inside the vehicle compartment, provided that an inequality of $a/A \geqq a'/A'$ is satisfied, where A is a thickness of the flat portion (main-body portion) of a door trim before core-back, a is a thickness of the flat portion (main-body portion) of the door trim after core-back, A' is a thickness of an upper surface (vertical wall portion) of an armrest before core-back and a' is a thickness of the upper surface (vertical wall portion) of the armrest after core-back.

(6) The recessed portion (thin-wall portion) is not required to continuously extend in a lengthwise direction (vehicle longitudinal direction) of the armrest. For example, the recessed portion may be formed at part of the armrest in the lengthwise direction, or may be formed at the armrest by dividing it into multiple portions in the lengthwise direction.

(7) The above-described illustrative aspects show aspects where the present invention is applied to a vehicle door trim, but the present invention may be applied to other automotive interior materials such as a vehicle quarter panel and a pillar garnish.

The invention claimed is:

1. A method of manufacturing an automotive interior member, comprising:

providing a first mold, and a second mold having a protrusion portion;

arranging the first mold and the second mold so as to form a cavity having a predetermined size, the cavity including a main cavity portion and a horizontal cavity portion connected to the main cavity portion, the horizontal cavity portion extending substantially perpendicularly to the main cavity portion, and the protrusion portion being arranged to protrude into the horizontal cavity portion;

supplying molten resin material having a foaming agent into the cavity;

forming a substantially-planar main body of the automotive interior member with the resin material in the main cavity portion such that the main body has a predetermined thickness;

forming a substantially-planar wall portion of the automotive interior member with the resin material in the horizontal cavity portion;

forming a groove in a surface of the wall portion with the protrusion portion of the second mold, the surface of the wall portion facing outward from a vehicle compartment when the automotive interior member is installed in the vehicle compartment, the groove having a dimension longer in an opening direction in which at least one of the first mold and the second mold is moved to open the cavity than in a thickness direction of the wall portion, the opening direction being substantially perpendicular to a longitudinal direction of the main cavity portion; and moving one of the first mold and the second mold relative to the other of the first mold and the second mold in the opening direction so that a size of the main cavity portion increases to the predetermined thickness of the main body and the molten resin material foams in the cavity, forming the automotive interior member, wherein said forming the groove includes forming the groove in a central portion of the wall portion, wherein said providing the first mold and the second mold includes providing the second mold so as to have the protrusion in a substantially triangular shape in a cross-sectional view, and wherein said forming the groove includes forming the groove in a V-shaped valley.

2. The method of manufacturing an automotive interior member according to claim 1, further comprising forming a decorative surface on the wall portion with the first mold, wherein said forming the groove includes forming the groove in an opposite surface of the wall portion to the decorative surface such that a distance between a bottom of the groove and the decorative surface is smaller than a thickness of a remainder of the wall portion so that the automotive interior member is capable of deforming at the groove when a force of a predetermined strength is applied to the decorative surface of the wall portion.

3. The method of manufacturing an automotive interior member according to claim 1, wherein said moving includes moving one of the first mold and said second mold relative to the other of the first mold and the second mold in the opening direction a distance smaller than a length of the horizontal cavity portion.

4. The method of manufacturing an automotive interior member according to claim 1, wherein the automotive interior member is a door trim configured to be mounted on a vehicle door panel, said forming the substantially-planar main body includes forming the main body so as to be capable of covering the vehicle door panel, and said forming the wall portion includes forming the wall portion so as to be capable of protruding into a vehicle compartment.

5. The method of manufacturing an automotive interior member according to claim 1, wherein said forming the groove includes forming the groove to have a first surface extending from the surface of the wall portion and a second surface extending from the surface of the wall portion, the first surface having a length longer than a length of the second surface.

6. The method of manufacturing an automotive interior member according to claim 1, wherein the first surface of the groove contacts the second surface of the groove.

* * * * *